United States Patent Office
2,917,481
Patented Dec. 15, 1959

2,917,481

COATING COMPOSITION CONTAINING PHENOL ALDEHYDE CONDENSATION PRODUCT, VINYL POLYMER, CATALYST, AMINE PHOSPHATE AND HEAVY METAL SALT

John Edmund Masters, Lombard, Ill., assignor to American Can Company, New York, N.Y., a corporation of New Jersey No Drawing. Application August 27, 1953
Serial No. 376,971

14 Claims. (Cl. 260—43)

The present invention relates to a new and improved coating composition. More particularly the present invention pertains to a new and improved synthetic resin, coating composition for ferrous surfaces.

In my copending patent application, Serial Number 299,245, filed July 16, 1952, I have disclosed an organic coating composition containing certain proportions and members of the class of a polymerizable phenol base resin, a vinyl polymer, a polymerization catalyst for the phenol base resin and an amine phosphate corrosion inhibitor. It is further disclosed in my said copending application that the resin composition described therein is far superior to prior organic coatings as to heat stability and adhesion to a ferrous surface and as a protective covering for a ferrous surface against corrosion by sulfur bearing compounds and against underfilm, oxidative corrosion. The present invention relates to an improvement of this composition whereby its superior properties are markedly enhanced.

Therefore it is an object of the present invention to provide a novel resin coating for ferrous surfaces having improved properties of heat stability and adhesion.

Another object of the invention is the provision of a novel organic coating for ferrous surfaces which coating has improved resistance to organic solvents, fatty acids and glycerides and which more efficiently prevents corrosion of the substrate metal by sulfur bearing compounds, especially those produced by the decomposition or degradation of proteinaceous matter.

Still another object of the invention is to provide an organic coating composition that more efficiently prevents or more markedly reduces underfilm, oxidative corrosion of a coated ferrous surface.

Numerous other objects and advantages of the invention will be apparent to those skilled in the art as it is better understood from the following description.

The primary utility for the composition of the present invention, as is the utility of the coating described in my said copending application, is as an inside coating for sheet metal containers, i.e. the organic composition film intermediate the bare metal wall of the container and the contents packed therein. The types of sheet metal generally used in the container industry are ferrous sheets, e.g. steel, black iron, terne plate, and tin coated ferrous sheets known as tin plate.

In the past, organic coatings were generally formulated for application over tin plate. None of these formulations however were fully satisfactory on ferrous surfaces for heat processed products and most were unsatisfactory for moist, non-processed products. Due to the relatively high reactivity of iron, none of the prior art coatings gave really efficient protection to ferrous surfaces against corrosion, e.g. attack by acids and oxidizing agents such as sulfur and oxygen. Also loss of adhesion of the coating to the ferrous substrate was a serious problem. This was caused by corrosion of the substrate metal due to the permeability of the film to liquid and/or gaseous corrosive materials as set forth above and by dissolution or softening of the film by contact at normal and elevated temperatures with materials as organic solvents, fatty acids or glycerides. The coating composition disclosed in my above mentioned copending patent application obviates these difficulties to a great extent and thereby provides an efficient coating for ferrous surfaces.

In working with the coating, however, it was determined that the coating was less effective on a tin plate surface than on a ferrous surface. Further investigation and experimentation was conducted in an effort to determine the cause of this discrepancy. I have now discovered that a composition comprising a polymerizable phenol base resin, a vinyl polymer, a polymerization catalyst for the phenol base resin, an acidic amine phosphate corrosion inhibitor and an organo-heavy metal compound yields a material that when applied to a ferrous surface and cured forms a coating material having greatly improved properties of adhesion to and corrosion protection for the ferrous substrate.

By the term phenol base resin is meant resins or potential resin forming material resulting from the reaction between phenol or substituted phenols with an aldehyde and derivatives of such reaction products. These include the B stage phenol-aldehyde resins which are insoluble in water but soluble in alcohols, and the monomers described in the R. W. Martin Patents Numbers 2,579,329, 2,579,330, and 2,579,331, issued on December 18, 1951, especially the methylol phenyl ethers in which the ether substituent has an unsaturated group, such as an allyl group. The organic solvent-soluble cashew nut shell oil-phenol thermosetting resins of the type described in the Shepard et al. Patent 2,203,206, issued June 4, 1940, are also suitable. Oil modified phenol base resins or potential resins of the types described above can be used. Mixtures of the phenol base resins are also satisfactory. The aldehyde referred to herein can be either one or a mixture of formaldehyde, acetaldehyde and butyraldehyde. Specific examples of the phenol base resins are the well known phenol-formaldehyde resin in its alcohol soluble stage, the monomeric allyl ethers of mono-, di- and trimethylol phenol and mixtures thereof, low molecular weight, alcohol soluble tertiary butyl phenol-formaldehyde, alcohol-soluble, heat convertible, phenol-cashew nut shell oil-formaldehyde resins known as Durez resins, such as Durez 12687, which may be converted to the infusible stage by heat and formaldehyde or a formaldehyde yielding substance, such as hexamethylene tetramine, a one step phenol-formaldehyde resin modified to eliminate alkali sensitivity, such as Durez 15956, and alcohol-soluble, heat convertible, phenol formaldehyde resins modified with a drying, semi-drying or non-drying oils or mixtures thereof. Any one or a mixture of these resins can be used with or without a drying, semi-drying or non-drying oil and mixtures of such oils.

The useful monomeric methylol derivatives of phenol are methylol phenyl ethers in which the H of the hydroxyl group attached to the phenyl group is substituted by an alkyl or cycloalkyl group, either saturated or unsaturated, or by an aralkyl group, as well as halogenated derivatives of the alkyl, cycloaliphatic and aralkyl groups. A typical example of such a compound has the general formula

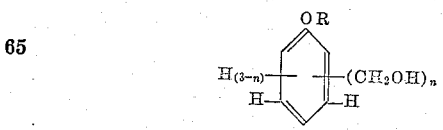

where R represents a number of the class consisting of alkyl, cycloaliphatic and aralkyl groups and halogenated derivatives thereof and $n$ represents an integer of from 1 to 3. Mixtures of the monomeric methylol phenyl ethers can also be employed in my compositions. A specific compound that is useful is one in which R represents an allyl group and $n$ represents the integer 3, such as

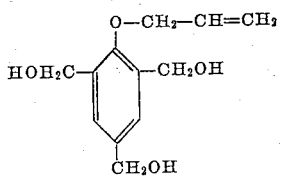

The preferred phenol base resin is a monomeric trimethylol phenyl allyl ether. This latter material may contain small amounts of monomethylol and dimethylol phenyl allyl ether.

The method of making unsaturated ethers of trimethylol phenol are described in R. W. Martin Patent 2,579,330, issued December 18, 1951. In general, the process consists of slowly adding formaldehyde to a strongly alkaline water solution of phenol and permitting the reaction to go to substantial completion. The methylol phenol can be recovered as a crystalline salt of an alkali metal and this salt may then be reacted with a monohalogen unsaturated organic compound in an alkaline medium.

The phenol base resin can be present in an amount ranging from about 40 to 98% by weight of the total resinous or potentially resinous material in the composition and preferably from about 65 to 85% by weight. It is necessary, however, that the phenol base resin be stable in a mildly acid medium.

An acid catalyst is required to accelerate the polymerization rate during the baking cycle, so that the coating becomes tough and solvent-resistant within a commercially acceptable period. Among the compounds that are suitable as catalysts are phosphoric, hydrochloric and sulfuric acids. Organic solvent soluble curing catalysts include ammonia and amine salts of toluene sulfonic acids, phenyl sulfonic acids, morpholine salts of phenol and benzene sulfonic acids, urea salts of phenol, and toluene sulfonic acids and urea and morpholine salts of sulfuric acid. Organic acids such as maleic or oxalic may also be used for this purpose. I prefer phosphoric acid which may be added in the form of an alcohol solution of 85% phosphoric acid. The concentration of catalyst can range from about 0.5 to about 20% by weight of the phenol base resin. I prefer a range of from about 1 to 5%.

The polyvinyl resins that are useful include polyvinyl formal, polyvinyl acetal, polyvinyl butyral, polyvinyl acetate and copolymers of vinyl acetate and vinyl chloride in which the viny chloride content ranges from 80 to 92%. All of the above commercially available vinyl polymers contain some free hydroxyl groups. I have ascertained that a minimum of 6% hydroxyl calculated as polyvinyl alcohol must be present to provide effective coatings. The maximum useful polyvinyl alcohol content is about 22%. Mixtures of these polyvinyl resins can also be employed. My preferred resin is a polyvinyl acetal having a polyvinyl alcohol content of from about 8 to 15%, and specifically preferred in this class is polyvinyl butyral. If the polyvinyl alcohol content of my polyvinyl resin or mixed vinyl resins is considerably above 22%, a container film does not have adequate resistance to moist natural fatty materials under sterilizing conditions to be useful for cans intended for packing such products. On the other hand, if the polyvinyl alcohol content of the vinyl resin is considerably below 6%, the amine phosphates described later do not impart a significant degree of corrosion inhibiting action to the finished composition. Because of the small amounts of the difficultly soluble polyvinyl butyral having considerably more than 22% polyvinyl alcohol that can be dissolved, the finished composition is not sufficiently flexible for drawing container parts from flat coated sheets and does not have sufficient resistance to volatile sulfides, fatty acids and glycerides to be useful as a coating material for packing fat or sulfide containing materials which require heat sterilization.

In my formulations the vinyl polymer content, based on the total resin or potentially resinous material, can vary between 2 and 60% but the preferred range is between 5 and 40% by weight of the resins. The polyvinyl acetal is preferably present in an amount of about 15 to 35% by weight of the resinous ingredients. The vinyl chloride-vinyl acetate copolymer in which the vinyl chloride content is about 90% or slightly more can preferably be present in amounts of about 10 to 20% by weight of total resinous ingredients and the copolymer of the same materials having a vinyl chloride content from 80 to about 90% can preferably be present in amounts of from about 10 to 30% by weight of the combined resins or potential resins. The preferred range for polyvinyl acetate is from 10 to 40% by weight of the resin constituents. The polyvinyl alcohol content of any of these vinyl resins must be within the range of 6 to 22% to provide satisfactory performance.

In order to prevent underfilm corrosion and sulfide staining of ferrous surfaces, small amounts of a corrosion inhibitor are necessary. I discovered that ortho, meta and pyro phosphate salts of primary, secondary and tertiary aliphatic amines, and mixtures thereof, serve to protect ferrous surfaces, if the above mentioned polyvinyl resins are also present in the composition. The most satisfactory corrosion inhibitors include mono dibutylamine pyrophosphate, triethyl ammonium metaphosphate, tertiary octylamine metaphosphate, laurylamine metaphosphate, allylamine metaphosphate, triamylamine pyrophosphate and dicyclohexylamine metaphosphate. Each of these amine phosphates is mildly acidic and, in the amounts employed, each is soluble in the volatile organic solvent systems used for dissolving the coating. These amine phosphates are useful in a range of from about 0.5% to about 60% by weight of polyvinyl resin, but the preferred range is from about 1 to 15%.

Other amine phosphates that are also useful, but which are less effective, yet still suitable corrosion inhibitors include hexamethylenediamine metaphosphate, triethanolamine metaphosphate, methyl amine pyro and metaphosphates, ethylenediamine metaphosphate and trimethylmelamine metaphosphate. The solubility of the latter group of amine phosphates in the organic solvent systems used for my compositions is considerably lower than that of the more effective inhibitors, and it is believed that this difference in solubility, rather than the difference in chemical structure, is responsible for the variation in degrees of protection against corrosive action on iron. The useful range of these less effective amine phosphates based on the vinyl polymer is 0.5 to 2.5%. These sparingly soluble amine phosphates contribute toward protection against corrosion proportionately to their concentration, when they are blended with the more soluble amine phosphates. Thus, a mixture of 1% mono dibutylamine pyrophosphate plus 1% triethanolamine metaphosphate provides greater cororsion resistance than 1% mono dibutylamine pyrophosphate alone or 1% triethanolamine metaphosphate alone.

According to the present invention the improvement over the composition disclosed in my said copending application is effected by adding thereto a relatively minor amount of an organo-heavy metal compound. While not wishing to be bound by any particular theory, it is thought that the metal of the organo-heavy metal compound forms a complex with the phenolic resin thereby, in a manner not fully understood, imparting the superior properties to the composition. This theory affords an explanation of why the coating composition disclosed in my copending application is effective over a ferrous surface but less effective over tin plate. It is reasoned that in the case of a ferrous surface the iron at the interface of the metal and coating reacts with the phenolic resin component of the coating to form the complex while in the case of tin plate, the tin being relatively inert, is much less reactive.

By the term organo-heavy metal compound as used herein is meant an organic compound having included in the molecule at least one atom of a metal having an atomic number greater than 21. Preferred in this range are metals having an atomic number of from 22 to 30, for example titanium, chromium, manganese, iron, cobalt, nickel, copper and zinc. Of these iron and copper appear to be the most effective. It has been determined that in order to be effective the organo-heavy metal compound must form a homogeneous composition with the remaining ingredients which composition must remain homogeneous throughout subsequent operations, e.g. application and cure. It is for this reason that the additive is limited to organo-heavy metal compounds since inorganic compounds, while possibly theoretically operable, will not remain uniformly distributed throughout the resin composition thereby producing spots of discontinuity in the final film at which corrosion of the metal substrate occurs. The only limitation on the organic portion of the organo-heavy metal compound is that when combined with the metal it forms a compound that is soluble in the solvent system for the resin composition. I have found that compounds formed by the replacement of an acidic hydrogen atom of an organic compound by the above mentioned metals are effective. Included in this category are mono and polybasic, aliphatic and aromatic carboxylic acids including carbamic acids, the thio and dithio analogues of these carboxylic acids, acidic hydroxy aromatic compounds in which the hydroxy radical is directly attached to the aromatic nucleus and oximes.

Specific compounds falling within these broad categories are ferous butyl phthalate, ferrous butyl maleate, ferrous butyl adipate, zinc butyl phthalate, zinc dibutyl dithiocarbamate, cuprous butyl phthalate, tetra butyl titanate, stearatochromic chloride, nickel diethyl dithiocarbamate, cobalt butyl phthalate, nickel diphenyl glyoxime, iron phenate, and manganese buntyl phthalate. The metal butyl phthalate compounds are preferred and of these ferrous butyl phthalate gives the best results. These organo-heavy metal compounds are added to the composition in an amount ranging from 5 to 1000 parts per million (p.p.m.) based upon the phenolic resin content with the preferred amount ranging from 300 to 500 p.p.m. It has been found that if the organo-heavy metal compound content is below 5 p.p.m. it has little or no effect in improving the properties of the coating and if present in excess of 1000 p.p.m. it reduces the process resistance of the coating.

It is well known in the prior art to incorporate organo-heavy metal compounds falling within the above definition into resinous coatings in which the resins cure by oxidative polymerization, for example oleoresinous coatings. Used as such the organo-heavy metal compounds are functioning as metallic driers. However, in the present invention, the organo-heavy metal compounds do not function similarly as metallic driers since the resins of the present composition do not cure by oxidative polymerization.

The organic coating must cover the plate completely and uniformly. For this reason, it is best applied to a ferrous web either as a solution in a volatile organic solvent or as an emulsion. The solution method is preferable, and the particular solvents are not especially critical. It is necessary, however, that the solvent be volatile at baking temperatures which may be as low as 250° F. or as high as 500° F. At the lower temperature a period of about 20 minutes may be required and at 500° F. a time of two minutes may suffice. The solvent must also be compatible with all the ingredients in their useful concentrations, so that precipitation, stratification or other separation does not occur. Due to the presence of vinyl polymers in the compositions, only very small amounts of aliphatic hydrocarbons can be tolerated. Suitable solvents comprise aryl or aralkyl hydrocarbons blended with alcohols, ketones, ethers or esters and mixtures thereof. Alcohols, ketones, ethers and esters or mixtures thereof can be used without the aryl or aralkyl hydrocarbons. Solvents comprising a mixture of aryl or aralkyl hydrocarbons and alcohols yield solutions with the lowest viscosity and for this reason are preferred.

Examples of the aromatic hydrocarbon solvents are xylene, toluene, and petroleum fractions having a high proportion of aromatic hydrocarbons and having a boiling range of about 300° F. to 415° F. Examples of suitable oxygen containing solvents are butanol, diacetone alcohol, isophorone, methyl isobutyl ketone, nitropropane, butyl cellosolve, tetrahydrofuran, cyclohexanone, amyl acetate, methyl cellosolve acetate, diisobutyl ketone and cyclohexanol. When using nickel diethyl dithiocarbamate as the organo-metal salt it is necessary that the solvent system contain at least 10% dimethyl formamide.

The following formulations are exemplary of my novel compositions but are in no way to be considered limitations thereof:

*Example I*

| Ingredient: | Parts by weight |
|---|---|
| Trimethylol allyl phenylether containing small amounts of mono and dimethylol derivatives thereof | 20.4 |
| Polyvinyl butyral containing about 12% polyvinyl alcohol | 5.9 |
| Triethyl ammonium orthophosphate | 0.9 |
| Phosphoric acid (85%) | 0.2 |
| Xylene | 41.5 |
| Butanol | 31.099 |
| Ferrous butyl phthalate | 0.001 |
| | 100.000 |

*Example II*

| Ingredient: | Parts by weight |
|---|---|
| Trimethylol allyl phenylether of Example I | 23.5 |
| Polyvinyl butyral containing about 16% polyvinyl alcohol | 2.8 |
| Triamylamine pyrophosphate | 1.4 |
| Phosphoric acid (85%) | 0.24 |
| Methyl isobutyl ketone | 32.057 |
| Butanol | 40.0 |
| Ferrous butyl phthalate | 0.003 |
| | 100.000 |

*Example III*

| Ingredient: | Parts by weight |
|---|---|
| Alkali insensitive phenolformaldehyde resin | 28.3 |
| Polyvinyl formal containing about 7% polyvinyl alcohol | 1.8 |
| Tertiary octylamine orthophosphate | 0.83 |
| Phosphoric acid (85%) | 0.30 |
| Cellosolve acetate | 17.73 |
| Diacetone alcohol | 51.03 |
| Ferrous butyl phthalate | 0.01 |
| | 100.00 |

Each of the above examples was duplicated but having substituted therein for the ferrous butyl phthalate the following organo-heavy metal compounds: zinc butyl phthalate, zinc dibutyl dithiocarbamate, cuprous butyl phthalate, stearatochromic chloride, nickel diethyl dithiocarbamate, nickel diphenyl glyoxime, ferrous butyl maleate and ferrous butyl adipate. Due to their lower solubility these last two organo-metal salts were used in an amount of 0.008 part by weight rather than the amounts shown in the above examples.

Example IV

| Ingredient: | Parts by weight |
|---|---|
| Trimethylol allyl phenylether of Example I | 22.20 |
| Polyvinyl butyral containing about 12% polyvinyl alcohol | 8.85 |
| Monodibutylamine pyrophosphate | 1.32 |
| Phosphoric acid (85%) | 0.21 |
| Toluene | 40.215 |
| Butanol | 27.20 |
| Ferrous butyl phthalate | 0.005 |
| | 100.000 |

In these examples trimethylol allyl phenylether is the only methylol phenyl ether specifically mentioned. It is to be understood however that other methylol phenyl ethers as described in the Martin Patent 2,579,331 may be substituted. In addition, other phenol base resins comprising organic solvent soluble phenol-aldehyde resins, phenol-cashew nut shell oil formaldehyde resins in their organic solvent soluble stage of polymerization and mixtures of any of these polymers can be used. The phenol base resin must be fairly stable under slightly acidic conditions.

Other amine phosphates, as indicated hereinbefore, can be employed alone or in mixtures.

In preparing my composition, I first dissolve or disperse the vinyl polymer in the solvent with vigorous stirring. The phenol base resin, which is usually considerably more soluble than the vinyl polymer, is added and stirring is continued until a uniform solution is obtained. The acid catalyst is added next. The catalyst may be added in the form of a 10-15% solution of 85% phosphoric acid in ethanol or butanol. Then the requisite amount of aliphatic amine phosphate corrosion inhibitor is added which may be in the form of an ethanol or butanol solution thereof. The addition of the organo-heavy metal compound is not a critical operation. It may be added during any of the proceeding steps as a 5-15% solution of organo-heavy metal compound in the appropriate solvent. After combining the several ingredients, the entire mixture is stirred to distribute all the components evenly throughout the solution. The coating is then ready for immediate use or it can be filled into containers for storage.

A small amount of an oily silicone polymer up to about 50 p.p.m. may be advantageously added to the coating for the purpose of lubricating the coated sheet in subsequent container making operations. This silicone, however, is not an essential ingredient of the composition.

It is thought that the invention and many of its attendant advantages will be understood from the foregoing description, and it will be apparent that various changes may be made in the matter of the ingredients, their identity and their proportions without departing from the spirit and scope of the invention or sacrificing all of its material advantages, the form hereinbefore described being merely a preferred embodiment thereof.

I claim:

1. A coating composition comprising (1) from about 40% to 98% by weight, based on the resinous and potentially resinous constituents of a polymerizable phenol-aldehyde condensation product, (2) a vinyl polymer selected from the group consisting of a polyvinyl acetal, polyvinyl acetate and copolymers of a vinyl halide and vinyl acetate, said vinyl polymer having a polyvinyl alcohol content of from about 6% to 22%, said polyvinyl acetal being present in an amount of from about 2% to 60% by weight of said resinous constituents, said copolymer having a vinyl halide content of from about 80% to 92% and being present in an amount of from about 10% to 30% by weight of said resinous constituents, said polyvinyl acetate being present in amounts of from 10% to 40% by weight of said resinous constituents, (3) from about 0.5% to 20% by weight based on said condensation product of a catalyst for converting said condensation product to an insoluble stage during a heating cycle, (4) from about 0.5% to 60% by weight of the vinyl polymer of an acidic aliphatic amine phosphate corrosion inhibitor having 3 to 15 carbon atoms, and (5) from about 5 to 1,000 parts per million based on said condensation product of a heavy metal salt of an acidic hydroxyl containing compound selected from the group consisting of an aliphatic carboxylic acid, an aromatic carboxylic acid, an aliphatic thiocarboxylic acid, an aliphatic dithiocarboxylic acid, an aromatic thiocarboxylic acid, an aromatic dithiocarboxylic acid, a phenol and an oxime, said heavy metal having an atomic number greater than 21.

2. The composition of claim 1 in which the metal salt is ferrous butyl phthalate.

3. The composition of claim 1 in which the metal salt is zinc butyl phthalate.

4. The composition of claim 1 in which the metal salt is cuprous butyl phthalate.

5. The composition of claim 1 in which the metal salt is stearatochromic chloride.

6. The composition of claim 1 in which the metal salt is nickel diethyl dithiocarbamate.

7. The composition of claim 1 in which the amine phosphate is monodibutylamine pyrophosphate.

8. The composition of claim 1 in which the amine phosphate is triethylammonium metaphosphate.

9. The composition of claim 1 in which the amine phosphate is tertiary octylamine metaphosphate.

10. The composition of claim 1 in which the amine phosphate is laurylamine metaphosphate.

11. The composition of claim 1 in which the amine phosphate is allylamine metaphosphate.

12. The composition of claim 1 in which the polyvinyl acetal is polyvinyl butyral.

13. The composition of claim 1 in which the polyvinyl acetal is polyvinyl formal.

14. A composition comprising (1) from about 65 to 85 percent by weight of the resinous and potentially resinous constituents of a polymerizable condensation product consisting of 1-allyloxy-2,4,6-tris (hydroxymethyl) benzene, (2) from about 15 to 35 percent by weight of the resinous constituents of polyvinyl butyral having a polyvinyl alcohol content of 8 to 15 percent, (3) from about 1 to 5 percent by weight of said condensation product of phosphoric acid as heat conversion catalyst for said condensation product, (4) from about 1 to 15 percent by weight of polyvinyl butyral of monodibutylamine pyrophosphate as a metal corrosion inhibitor and (5) from about 300 to 500 parts per million based on the said condensation product of ferrous butyl phthalate.

References Cited in the file of this patent

UNITED STATES PATENTS

| 1,995,954 | Albrecht | Mar. 26, 1935 |
| 2,069,247 | Hoag | Feb. 2, 1937 |
| 2,318,606 | Goebel et al. | May 11, 1943 |
| 2,371,866 | Barrett | Mar. 20, 1945 |
| 2,480,754 | McCarthy | Aug. 30, 1949 |
| 2,512,726 | Penn et al. | June 27, 1950 |
| 2,579,329 | Martin | Dec. 18, 1951 |
| 2,623,835 | Van Nelson | Dec. 30, 1952 |

OTHER REFERENCES

"The Technology of Plastics and Resins," by Mason and Manning, published 1945, page 170.